United States Patent
Joffre et al.

(10) Patent No.: US 9,315,631 B2
(45) Date of Patent: Apr. 19, 2016

(54) METHODS OF MAKING SACCHARIDE SILOXANE COPOLYMERS

(71) Applicant: Dow Corning Corporation, Midland, MI (US)

(72) Inventors: Eric J. Joffre, Midland, MI (US); Anil K. Tomar, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 68 days.

(21) Appl. No.: 14/371,217

(22) PCT Filed: Jan. 15, 2013

(86) PCT No.: PCT/US2013/021537
§ 371 (c)(1),
(2) Date: Jul. 9, 2014

(87) PCT Pub. No.: WO2013/109523
PCT Pub. Date: Jul. 25, 2013

(65) Prior Publication Data
US 2014/0357884 A1 Dec. 4, 2014

Related U.S. Application Data

(60) Provisional application No. 61/587,977, filed on Jan. 18, 2012.

(51) Int. Cl.
*C07F 7/04* (2006.01)
*C08G 77/26* (2006.01)

(52) U.S. Cl.
CPC ...................................... *C08G 77/26* (2013.01)

(58) Field of Classification Search
CPC ...................................................... C08G 77/26
USPC ......................................................... 556/423
See application file for complete search history.

(56) References Cited

U.S. PATENT DOCUMENTS

| | | |
|---|---|---|
| 4,591,652 A | 5/1986 | DePasquale et al. |
| 4,973,680 A | 11/1990 | Billmers |
| 5,004,791 A | 4/1991 | Billmers |
| 5,059,686 A | 10/1991 | Sau |
| 5,428,142 A | 6/1995 | O'Lenick |
| 5,498,703 A | 3/1996 | O'Lenick |
| 5,831,080 A | 11/1998 | Sejpka et al. |
| 5,895,794 A | 4/1999 | Berg et al. |
| 6,218,560 B1 | 4/2001 | Abele et al. |
| 6,255,429 B1 | 7/2001 | Griffin et al. |
| 6,307,000 B1 | 10/2001 | Wong |
| 7,078,519 B2 | 7/2006 | Brandstadt et al. |
| 7,834,087 B2 | 11/2010 | Joffre et al. |
| 7,871,987 B2 | 1/2011 | McAuliffe et al. |
| 8,247,357 B2 | 8/2012 | Joffre et al. |
| 2007/0021578 A1 | 1/2007 | Brandstadt et al. |
| 2008/0138386 A1 | 6/2008 | Joffre et al. |
| 2008/0199417 A1 | 8/2008 | Joffre et al. |
| 2008/0209645 A1 | 9/2008 | Carrillo et al. |
| 2009/0258058 A1 | 10/2009 | Thomas et al. |
| 2013/0115184 A1 | 5/2013 | Beck et al. |
| 2013/0149259 A1 | 6/2013 | DelValle et al. |
| 2013/0149260 A1 | 6/2013 | DelValle et al. |
| 2013/0149261 A1 | 6/2013 | DelValle et al. |

FOREIGN PATENT DOCUMENTS

| | | |
|---|---|---|
| CN | 101440376 | 5/2009 |
| JP | 62-68820 | 9/1985 |
| WO | WO 94/29324 | 12/1994 |
| WO | WO 99/21892 | 5/1999 |
| WO | WO 02/088456 | 11/2002 |
| WO | WO 2006/127883 | 11/2006 |
| WO | WO 2007/139812 | 12/2007 |
| WO | WO 2008/103219 | 8/2008 |
| WO | WO 2009/045709 | 4/2009 |
| WO | WO 2010/025381 | 4/2010 |

OTHER PUBLICATIONS

Database WPI Week 200941 Thomson Scientific, London, GB; AN 2009-K10539 XP002696936,—& CN 101 440 376 A (Univ Xiamen) May 27, 2009 abstract.

International Search Report and Written Opinion of the ISA in corresponding Int'l Appln. No. PCT/US2013/021537, mailed May 28, 2013 (12 pages).

"Silicones," *Encyclopedia of Polymer Science and Technology*, Wiley, US, Apr. 15, 2003, pp. 765-841, XP007918236, "RTV Silicone Chemistry," p. 810; "Polymerization," p. 772, and "MQ Resins,", p. 802.

"Polydimethylsiloxane Modified Chitosan. Part III: Preparation and Characterization of Hybrid Membranes," *Carbohydrate Polymers*, Applied Science Publishers, Ltd., Barking, GB, D. Enescu, et al., vol. 76, No. 2, Mar. 17, 2009, pp. 268-278, XP025913425.

*Primary Examiner* — Porfirio Nazario Gonzalez
(74) *Attorney, Agent, or Firm* — Baltazar Gomez

(57) ABSTRACT

A method of making a saccharide siloxane copolymer includes reacting an amine functional saccharide with an epoxy functional silane containing at least one condensable or hydrolysable group. This product is reacted with an oligomer to form the saccharide siloxane copolymer.

18 Claims, No Drawings

METHODS OF MAKING SACCHARIDE SILOXANE COPOLYMERS

CROSS REFERENCE TO RELATED APPLICATIONS

This application is a U.S. national stage of International Application No. PCT/US2013/021537, filed Jan. 15, 2013, which claims priority to U.S. Provisional Application No. 61/587,977 filed on Jan. 18, 2012, both of which are incorporated herein in their entireties.

FIELD OF THE INVENTION

The present invention generally relates to methods of making saccharide siloxane copolymers. More specifically, the present invention generally relates to methods of making saccharide siloxane copolymers that includes amine functional saccharides.

BACKGROUND OF THE INVENTION

Saccharide siloxanes are known in the art. Saccharide siloxanes including a hydroxyl functional saccharide component and an organosiloxane component were found to be useful when applied to hair, skin, fabric, paper, wood and other substrates. Many syntheses of saccharide functional siloxanes are based on an aldonamide reaction of aminosiloxanes with gluconolactone or lactobionolactone in a polar solvent. These polymers showed instability due to hydrolytic cleavage of aldonamide linkage upon aging. Other syntheses of saccharide functional siloxanes tend to be disadvantageous because the reaction times are very sluggish. It would be desirable to have a method of making saccharide siloxane copolymers that significantly reduce the overall reaction time and cost of manufacturing, while having a desired stability.

SUMMARY OF THE INVENTION

According to one method, a saccharide siloxane copolymer is made by reacting an amine functional saccharide with an epoxy functional silane containing at least one condensable or hydrolysable group. The product of this reaction is reacted with an oligomer to form the saccharide siloxane copolymer.

According to another method, a saccharide siloxane copolymer is made by reacting N-methylglucamine or N-ethylglucamine with an epoxy functional mono or di-alkoxy silane. The product of this reaction is reacted with a disilanol oligomer to form the saccharide siloxane copolymer.

DETAILED DESCRIPTION OF ILLUSTRATED EMBODIMENTS

A method of making a saccharide siloxane copolymer includes (a) reacting an amine functional saccharide with an epoxy functional silane containing at least one condensable or hydrolysable group; and (b) reacting the product of step (a) with an oligomer to form the saccharide siloxane copolymer. The method of making the saccharide siloxane copolymers significantly reduced the reaction times, which was unexpected. The resulting saccharide siloxane copolymers are useful when applied to hair, skin, fabric, paper, wood and other substrates.

Definitions and Usage of Terms

The art of "personal care" is intended to include any topical treatment of any portion of the body that is intended to provide a benefit to that portion of the body. The benefit may be direct or indirect, and may be sensory, mechanical, cosmetic, protective, preventative or therapeutic. While it is contemplated that the human body is a particularly desirable target substrate for the presently disclosed personal care compositions and products formed by the methods of the present invention, it will be readily apparent to one skilled in the art that other mammals having similar tissues, especially keratinacious tissue such as skin and hair, may be suitable target substrates and that therefore veterinary applications are within the scope of the present invention.

The personal care compositions formed by the methods of the present invention are adapted to provide a benefit to a portion of the body. As used herein, "adapted" means formulated in a manner that permits safe and effective application of the benefit to the portion of the body. As used herein, "safe and effective" means an amount that provides a level of benefit perceivable by a consumer seeking such a benefit without damaging or causing significant discomfort to the consumer seeking such a benefit. A significant discomfort is one that outweighs the benefit provided such that an ordinary consumer will not tolerate it.

A person of ordinary skill in the personal care formulation arts will appreciate the well-known criterion for selecting the essential ingredients, optional additives and excipients that are suitable according to the intended application of a particular personal care composition. Non-limiting examples of additives that may be formulated into the personal care compositions in addition to the copolymers include: additional silicones, aerosols, anti-oxidants, cleansing agents, colorants, additional conditioning agents, deposition agents, electrolytes, emollients and oils, exfoliating agents, foam boosters, fragrances, humectants, occlusive agents, pediculicides, pH control agents, pigments, preservatives, biocides, other solvents, stabilizers, sunscreening agents, suspending agents, tanning agents, other surfactants, thickeners, vitamins, botanicals, waxes, rheology-modifying agents, anti-dandruff, anti-acne, anticarie and wound healing-promotion agents.

It is not uncommon for certain benefits to be sacrificed in personal care products formulated to provide multiple benefits in a single product. For instance, with respect to hair, an increase in conditioning benefit is often accompanied by a decrease in hair "body" or volume. Addition of the copolymer may permit the formulation of products that combine such benefits without sacrificing the efficacy of some, and, indeed, in some formulations it provides synergy with respect to the combination of benefits. Personal care products formulated from the personal care compositions comprising the copolymers formed by the methods of the present invention may provide enhancements in benefits that typically derive from effects which antagonize one another, for example, enhancing both conditioning and curl retention benefits. They also may provide thickening benefits in hair, skin, and color cosmetics.

In addition, the addition of the copolymer formed by the methods of the present invention to personal care compositions may eliminate or lessen the need for certain other additives. For example, because of the increased hydrogen bonding properties of the copolymers, it is an effective thickening agent for cyclic silicones and may therefore lessen the need for other thickening additives, which may incidentally confer undesirable product properties such as stringency, residue formation and/or conditioning defects.

The copolymers formed by the methods of the present invention may be a gum, waxy solid or solid at ambient conditions. It should be noted, however, that there is a subset of the copolymer that exists in a liquid form, and liquid dispersible forms may also be produced by manipulating conditions such as temperature. However, for some copolymers to achieve a viscosity range that permits ready formation of dispersions, for example solutions or emulsions, the copolymer must first be solubilized by being dissolved in a suitable solvent or solvent blend.

The solubilized copolymer is then used to form a solution or emulsion for ready delivery into the personal care composition. The particular solvent blend is selected based upon the ionic properties of the copolymer, and the suitability of that solvent for the intended application. In one specific embodiment the solvent blend comprises a mixture of paraffin and an alcohol. In a very specific embodiment, the alcohol comprises isopropyl alcohol, 2-butyl-octanol, or a combination thereof. Alternatively, the alcohol may comprise 2-butyl-octanol.

The term "dispersion" as used herein means a two-phase system where a first phase comprises finally divided particles distributed throughout a bulk second phase and the first phase constitutes an "internal" or dispersed phase while the second phase constitutes an "external" or continuous phase.

The term "solution" as used herein is intended broadly to include mechanical dispersions, colloidal dispersions and true solutions, and should not be construed as limited to the latter. A solution is a dispersion comprising a uniformly dispersed mixture wherein a first phase constitutes the solute and a second phase constitutes the solvent.

The term "emulsion" as used herein means a dispersion comprising a mixture of two immiscible liquids with the liquid constituting the first, dispersed internal phase being suspended in the second, continuous phase with the aid of an emulsifier.

All amounts, ratios, and percentages are by weight unless otherwise indicated. As used herein, the articles 'a' 'an' and 'the' each refer to one or more, unless otherwise indicated by the context of the application.

Methods of The Present Invention

A method of making a saccharide siloxane copolymer includes (a) reacting an amine functional saccharide with an epoxy functional silane containing at least one condensable or hydrolysable group; and (b) reacting the product of step (a) with an oligomer to form the saccharide siloxane copolymer.

The amine functional saccharide that may be used in methods of the present invention are defined herein as including saccharide derivatives of the same. In one embodiment, the amine functional saccharides include at least two hydroxyl groups. The amine functional saccharides typically include at least two or three hydroxyl groups and at least one primary or secondary amine.

Non-limiting examples of amine functional saccharides to be used in the methods of the present invention include, but are not limited to, N-methylglucamine, N-ethylglucamine, glucosamine, galactosamine, muramic acid, mannosamine, chitosan, chitosan monomers, chitosan oligomers, meglumine and mixtures thereof. These saccharides may contain primary or secondary amine functionality that can react with epoxy groups of hydrolysable silane monomers or polymers. It is contemplated that other amine functional saccharides may be used in the methods of the present invention.

The epoxy functional silanes to be used in the present invention contain at least one condensable or hydrolysable group. The term "hydrolysable" group means that these groups attached to the silicon atom will react in the presence of moisture with hydroxyl groups (e.g., silanols) or will react with other hydrolyzable groups to form Si—O—Si bonds.

One example of an epoxy functional silane is an epoxy functional mono or di-alkoxy silane. The more preferred alkoxy groups include methoxy, ethoxy, propoxy, butoxy and mixtures thereof. It is contemplated that other alkoxy groups may be used as the condensable or hydrolysable groups such as isopropyl, octadecyl, allyl, hexenyl, cyclohexyl, phenyl, benzyl, beta-phenylethyl, any hydrocarbon ether radical such as 2-methoxyethyl, 2-ethoxyisopropyl, 2-butoxyisobutyl, p-methoxyphenyl, —(CH$_2$CH$_2$O)$_2$CH$_3$ and mixtures thereof.

Other non-limiting examples of condensable or hydrolysable groups that may be used in the epoxy functional silanes include, but are not limited to, an amino radical, a ketoxime, an ureido group, an acetoxy group, a carboxyl group, a carboxylic amide radical, a cyano group, isocyanate group, sulfate group, sulfate ester group, phosphate group, or a phosphate ester group. Examples of these condensable or hydrolysable groups may be found in U.S. Pat. No. 5,895,794.

Non-limiting examples of epoxy functionality silanes include epoxycyclohexylethyl functional silanes, glycidoxypropyl functional silanes, epoxy alkanes (e.g., 1,2 epoxy hexane), limonene epoxide functional silanes and mixtures thereof.

Some non-limiting examples of glycidoxypropyl functional silanes include 3-glycidoxypropylmethyldimethoxysilane, 3-glycidoxypropylmethyldiethoxysilane, 3-glycidoxypropylmethyldipropoxysilane, 3-glycidoxypropyldimethylmethoxysilane, 3-glycidoxypropyldimethylethoxysilane, 3-glycidoxypropyldimethylpropoxysilane and mixtures thereof. It is contemplated that other glycidoxypropyl functional silanes may be used.

The molar ratio of the amine functional saccharide to the epoxy functional silane is generally from 1.2:1.0 to 0.5:1.0, alternatively from 1.1:1.0 to 0.8:1.0, and alternatively from 1.05:1.0 to 0.95:1.0.

The reaction of an amine functional saccharide with an epoxy functional silane containing at least one condensable or hydrolysable group may be performed neat or in the presence of a solvent. The reaction of an amine functional saccharide with an epoxy functional silane may be performed in a polar solvent. Some non-limiting examples of polar solvents that may be used include methanol, ethanol, isopropanol or combinations thereof. It is contemplated that other solvents may be used in the reaction of an amine functional saccharide with an epoxy functional silane. All or a portion of the solvent may be removed, for example, by stripping or distillation, after this reaction is completed. This removal of the solvents may take place using a vacuum.

The reaction of an amine functional saccharide with an epoxy functional silane may be performed by heating. The exact temperature depends on various factors including the specific ingredients selected and type of solvent used. Temperatures, however, generally range from 60 to 80° C. and reaction time may be several hours, alternatively, up to 5 hours, alternatively with 0.5 to 2 hours.

The product of the reaction of an amine functional saccharide with an epoxy functional silane depends on the starting materials. Some non-limiting products include, but are not limited to, NMG methyldimethoxysilane, NMG methyldiethoxysilane, NMG dimethylmethoxysilane, NMG dimethylethoxysilane and NMG triethoxysilane. The expected product mainly is a monomer but dimers, trimers and oligomers may be possible. One non-limiting example of a reaction between an amine functional saccharide with an epoxy functional silane is (3-glycidoxypropylmethyldimethoxysilane (Formula I) with N-methylglucamine (NMG) (Formula II) to form NMG methyldimethoxysilane (Formula III) using methanol as a solvent.

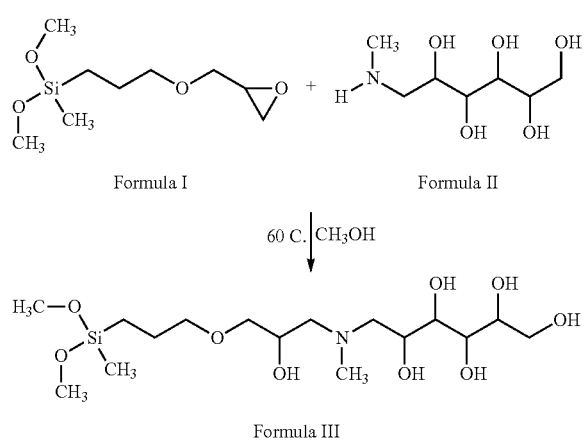

Formula I          Formula II

Formula III

The product of the reaction between the amine functional saccharide with the epoxy functional silane is then reacted with a siloxane oligomer or polymer using condensation process to form the saccharide siloxane copolymer.

The oligomers that may be used in the methods of the present invention include disilanol functional oligomers. One non-limiting example of a disilanol functional oligomer includes the following:

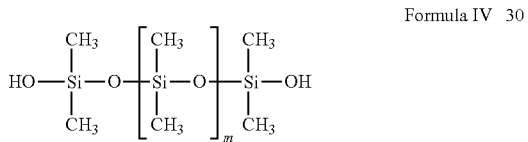

Formula IV wherein m is generally from 3 to 1000, alternatively from 20 to 500, and alternatively from 30 to 200. It is contemplated that other disilanol functional oligomers may be used in the methods of the present invention. Useful oligomers for condensation chemistry include disilanol siloxanes. For equilibration chemistry, cyclic siloxanes and disilanol siloxanes may be used.

To assist in controlling the molecular weight or degree of polymerization (DP) in the finalized saccharide siloxane copolymer, an endcapper or endcapping agent may be reacted with the oligomer. The endcapper typically includes a non-condensable end group and a condensable end group.

One example of an endcapper is trimethyl alkoxysilane. The more preferred alkoxy groups to be used in the endcapper include methoxy, ethoxy, propoxy and mixtures thereof. Thus, examples of endcappers include trimethyl methoxysilane, trimethyl ethoxysilane and trimethyl propoxysilane. It is contemplated that other alkoxy groups may be used in the endcapper.

In another example, the endcapper is hexamethyldisilazane (HMDZ). It is contemplated that other endcappers may be used to react with the oligomers used in the methods of the present invention. Endcappers may include, but are not limited to, trialkyl silanols, trialkyl chlorides, trimethylsilyl endcapped siloxanes and hexamethyldisiloxanes.

The amount of endcapping on the oligomers is a function on the molar ratio of endcapper to oligomer. The amount of endcapper depends on the ratio of the DP of the final product to the DP of the oligomer initially used. The molar ratio is also dependent on siloxane DP and moles of silanols. The molar ratios of oligomer silanols to endcapper is generally from 1:0.001 to 1:0.2 and alternatively from 1:0.01 to 1:0.1.

For example, to prepare a 300 DP polymer starting with a 50 DP disilanol oligomer, the molar ratio of oligomer to a difunctional endcapper would be 6:1. To prepare a 300 DP polymer starting with a 10 DP disilanol oligomer, the molar ratio of oligomer to a difunctional endcapper would be 30:1. For a monofunctional encapper, the molar ratios would be 3:1 and 15:1, respectively. The molar ratios of disilanol oligomers to difunctional endcappers are generally from 1:1 to 500:1, alternatively from 2:1 to 250:1, alternatively from 3:1 to 150:1, and alternatively from 4:1 to 30:1. The molar ratios of disilanol oligomers to mono-functional endcappers are generally from 0.5:1 to 250:1, alternatively from 1:1 to 125:1, alternatively from 1.5:1 to 75:1, and alternatively from 2:1 to 15:1.

If the ratio of oligomer is greater than the endcapper on a molar basis, a mixture of capped oligomers and uncapped oligomers (e.g., disilanol oligomer) will be formed. Thus, the oligomers can be a partially capped siloxane. The greater the amount of endcapper used relative to the oligomer, the greater amount of endcapping that occurs on the oligomer.

For example, using a molar ratio of 6:1 of Formula IV to HDMZ, a mixture of Formula IV and capped oligomer (Formula V below) would be formed.

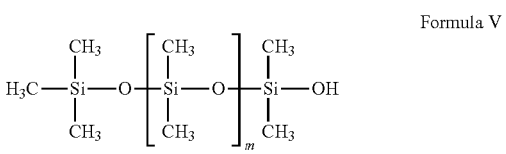

Formula V wherein m is generally from 3 to 1,000, alternatively, from 20 to 500, and alternatively from 50 to 300.

It is contemplated that other capped oligomers can be formed than a silanol capped dimethylsiloxane.

The oligomer, whether capped, uncapped or a mixture thereof, is then reacted with the product of the reaction between the amine functional saccharide with the epoxy functional silane to form the saccharide siloxane copolymer. To assist in the reaction with the oligomer, acid or base catalysts may assist in the reaction. Non-limiting examples of acids that may be used to assist in the reaction with the oligomer include, but are not limited to, octanoic acid catalyst, trifluoroacetic acid (TFAA), octanoic acid (OA), trifluoromethanesulfonic acid, sulfuric acid, hydrochloric acid and acetic acid.

Non-limiting examples of base catalysts that may be used to assist in the reaction with the oligomer include, but are not limited to, potassium hydroxide (KOH) and sodium hydroxide (NaOH), potassium silonates, ammonia and ammonium hydroxides. When using a base catalyst, the resulting product can be neutralized.

The reaction may be a condensation or an equilibrium reaction. In one process, the condensation process is a silanol condensation process.

In one example, the saccharide siloxane copolymers may be synthesized by acid- or base-catalyzed condensation of silanol-containing polysiloxanes with amide functional mono- or di-condensable or hydrolyzable groups. Non-limiting examples of a mono- or di-condensable or hydrolyzable groups are alkoxys. The method for making the saccharide siloxane copolymers significantly reduces the overall reaction time and cost of manufacturing.

For example, NMG methyldimethoxysilane may be reacted with capped and uncapped oligomers using an acid based catalyst. One non-limiting example is shown below:

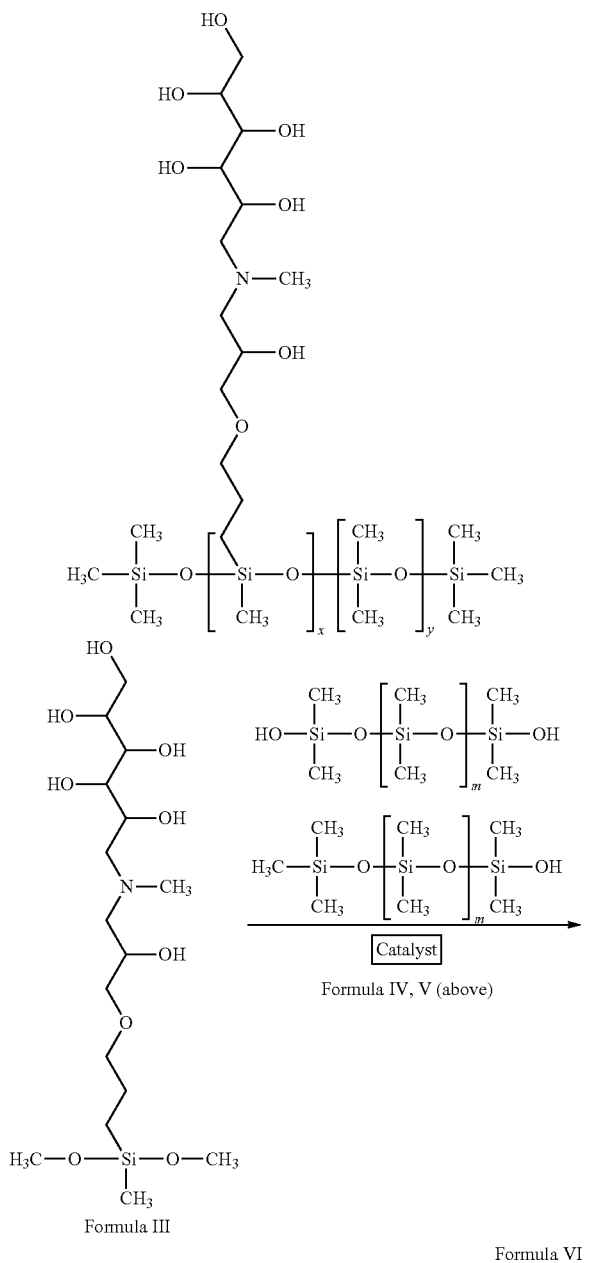

Formula III

Formula VI

Formula III, which is a NMG silane, reacts with an uncapped oligomer and a capped oligomer (Formulas IV and V, respectively) with a catalyst to form Formula VI. Formula VI is a N-methyl glucamine functional polysiloxane wherein x is generally from 1 to 30, alternatively from 1 to 20, and alternatively from 1 to 10; and y is generally from 0 to 1,000, alternatively from 5 to 500, and alternatively from 20 to 300. It is noted that water and methanol are byproducts formed from the reaction above.

In another example, NMG methyldimethoxysilane may be reacted with a silane endcapper and uncapped oligomer using an octanoic acid catalyst. One non-limiting example is shown below:

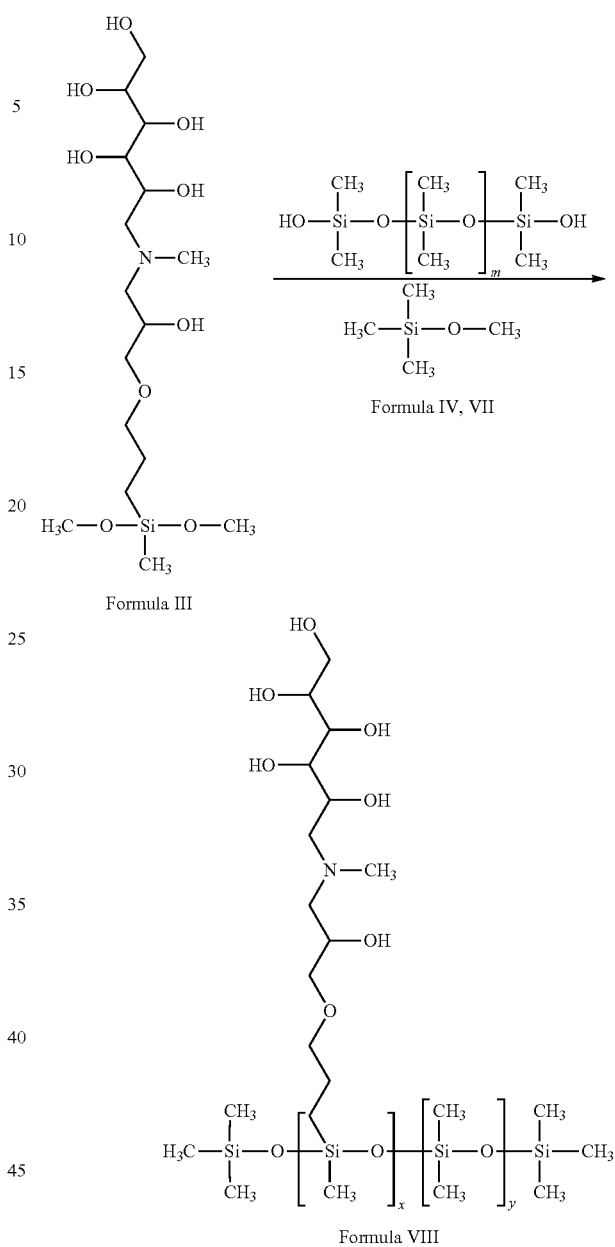

Formula III

Formula IV, VII

Formula VIII

Formula III, which is a NMG silane, reacts with an uncapped oligomer and a silane encapper (Formulas IV and VII, respectively) to form Formula VIII.

The condensation reaction may be performed neat or in in presence of a solvent. There are several types of solvents that may be used in the condensation reaction. It is desirable to have a solvent that would not interfere with the condensation chemistry and would reduce the viscosity of the reaction mixture and the product to facilitate the processing. For example, an aprotic solvent may be used as a diluent due to very high viscosity of the copolymer during the condensation process. Some non-limiting examples of aprotic solvents that may be used in the condensation reaction include ethyl acetate, butyl acetate, and toluene. Toluene was desirable because it reduced the viscosity as well as being compatible to the polymers. Other solvents such as alcohols may be used, but it is desirable to remove the alcohols continuously because they can hinder in the condensation reaction. Alternatively, the copolymer may be left in the solvent after the method is complete, for example, if the solvent is a suitable carrier medium for a composition in which the copolymer will be formulated.

The condensation reaction may be performed by heating. The exact temperature depends on various factors including the specific ingredients selected. Temperatures, however, generally range from 50 to 80° C. and reaction time may be several hours, alternatively, up to 10 hours, alternatively from 1 to 5 hours.

In addition to condensation routes, equilibrium processes may be used in the methods of the present invention. In equilibrium reactions, cyclic siloxanes and linear siloxanes are cleaved at siloxane bonds to form reactive monomers and oligomers. Equilibrium processes often contain a higher level of cyclic siloxanes in their final products. A non-limiting example of a linear siloxane is a low viscosity trimethylend-blocked polydimethylsiloxane. It is contemplated that other linear siloxanes, including polyalkylsiloxanes, may be used in equilibrium processes.

Saccharide Siloxane Copolymer

The saccharide siloxane copolymers made by the methods of the present invention have a desired aqueous stability. The copolymers comprise a saccharide component and a siloxane component. The siloxane component forms the backbone of the copolymer molecule. Saccharide components may be bonded to the siloxane backbone in terminal groups, pendant groups, or both terminal and pendant groups. Alternatively, the saccharide component may be bonded to the siloxane backbone in a pendant group. Without wishing to be bound by theory, it is thought that when the copolymer contains a pendant saccharide component, the copolymer has improved stability in the presence of water. And, when the copolymer contains pendant saccharide components and no terminal saccharide components, the copolymer may exhibit even further improved stability in the presence of water as compared to a copolymer having terminal saccharide components and no pendant saccharide components.

The saccharide siloxane copolymer may be a solid or a fluid under ambient conditions of temperature and pressure, e.g., at 25° C. and 760 mmHg. Whether the copolymer is a solid at ambient conditions, or a fluid such as a liquid or a gum, depends on various factors including the degree of polymerization (DP) of the copolymers. The saccharide siloxane copolymer may have a DP ranging from 3 to 1000, alternatively from 20 to 800, alternatively from 50 to 500, and alternatively from 100 to 400.

The copolymer made by the methods of the present invention described above may be formulated in a composition. The composition may include the formed copolymer and an additional ingredient. The additional ingredient depends on the specific formed copolymer and the desired end use for the composition.

The composition may be a personal care composition. The personal care composition may comprise: (1) the copolymer formed by the methods of the present invention, and optionally (2) a carrier medium suitable to permit topical application of the personal care composition to a portion of the body. The personal care composition is adapted to provide a benefit to the portion of the body to which it is applied. In addition, the personal care composition may optionally comprise a surfactant such as a nonionic surfactant.

Alternatively, the copolymer may be delivered to the personal care composition as a dispersion. Diluting or dispersing the copolymer makes it easier to process, and suitably employable solvents include polydimethylsiloxanes, hydrocarbons, and alcohols. Particularly suitable solvents are cyclic siloxanes, hydrocarbon-alcohol mixtures, linear long chain alcohols and branched long chain alcohols, and water.

Due to the compatibility of the copolymer with hydrocarbons, silicones and alcohols, as well as with water, they may be incorporated into both aqueous and non-aqueous based personal care products, which provide a benefit to the portion of the body. In embodiments where the portion of the body comprises hair, the benefit may include increased ease and hold of hair-styling, fixative effects and shine-enhancement.

The copolymers may be formulated into a composition in a substantially pure form, or as a dispersion in the form of either a solution or an emulsion. Depending on the form used, the copolymer may be formulated into oil-in-water, water-in-oil, water-in-silicone, and silicone-in-water systems. In the case of some aqueous-based formulations the saccharide-siloxane copolymers may be added directly to the formulation as a solid. In one embodiment, the dispersion is in the form of a solution. The solvent may be substantially aqueous or substantially non-aqueous depending on the desired end use of the composition. In a specific embodiment, the substantially non-aqueous solvent comprises a volatile or non-volatile solvent and in a very specific embodiment the substantially non-aqueous solvent comprises a volatile hydrocarbon or a silicone or mixtures thereof. In a more specific embodiment, the substantially non-aqueous solvent comprises a silicone.

The term "volatile" as used herein means that the solvent exhibits a significant vapor pressure at ambient conditions. Examples of suitable volatile silicones include siloxanes such as phenyl pentamethyl disiloxane, phenylethylpentamethyl disiloxane, hexamethyldisiloxane, methoxy propylheptamethyl cyclotetrasiloxane, chloropropyl pentamethyl disiloxane, hydroxypropyl pentamethyl disiloxane, octamethyl cyclotetrasiloxane, decamethyl cyclopentasiloxane and mixtures thereof. Particularly suitable silicones are the cyclomethicones. In a very specific embodiment the volatile silicone comprises a cyclic siloxane.

The copolymer ingredient is typically added to the personal care composition as a dispersion. Because of this, one may describe its concentration with respect to either the dispersion component or the personal care composition as a whole. In one embodiment wherein the personal care composition comprises a dispersion, the dispersion comprises from 0.1% to 50% copolymer by weight percent and from 0.01% to 25% copolymer by weight percent of the composition. In a more specific embodiment, the dispersion comprises from 2% to 40% copolymer by weight percent and from 0.2% to 10% copolymer by weight percent of the composition. In an even more specific embodiment, the solution comprises 20% copolymer by weight percent and 0.5 to 2% copolymer by weight of the composition.

In one embodiment of the personal care composition, the dispersion is in the form of an emulsion. The emulsion additionally comprises a surfactant to maintain the dispersion, and water as the continuous phase. The internal phase comprises the dispersed solubilized copolymer. Nonionic, amphoteric (including zwitterionic), anionic or cationic surfactants may all be suitable. Oil-in-water emulsions are typically used because they are easier to handle and disperse readily into water-based formulations.

An additional embodiment of the present invention is directed to a copolymer emulsion. The emulsion is an oil-in-water emulsion comprising an internal phase comprising the copolymer and a continuous phase comprising water. The copolymer emulsion comprises a surfactant that maintains the dispersion of the internal phase due to its amphipathic character.

Other embodiments provide methods for preparing the emulsions. The copolymer emulsions may be prepared either by: (1) emulsifying preformed copolymers or (2) by polymerizing monomers into a higher molecular weight copolymer in each individual emulsion particle e.g., via emulsion or suspension polymerization. In one embodiment, a surfactant-water blend is initially added to a solubilized copolymer to establish the dispersion and fix the water phase. Optional additional portions of water are added as required by the desired property profile of the emulsion and/or its intended applications.

It will be understood by one of ordinary skill in the art that there is a continuum for the ease with which a desired emulsion forms. Copolymer emulsions share similar constraints with other emulsions. That is, they are thermodynamically unstable, require a surfactant to maintain the dispersion, and need an input of energy to initiate emulsification. Simple agitation via mixing may be sufficient, or higher shear means including the employment of high shear devices may be required. In other instances, a polymer emulsification or inversion method may be needed.

A degree of agitation necessary to form the emulsion may require employment of mixing devices. Mixing devices typically provide the required energy input. Non-limiting examples of these mixing devices spanning the shear range include: (1) a vessel with an impeller, for example, propeller, pitched blade impeller, straight blade impeller, Rushton impeller, or Cowles blade; (2) kneading type mixers, for example, Baker-Perkins; (3) high shear devices that use positive displacement through an orifice to generate shear (e.g., a homogenizer, sonolator, or microfluidizer); (4) high shear devices using a rotor and stator configuration (e.g., colloid mills, homomic line mills, IKA, or Bematek); (5) continuous compounders with single or dual screws; (6) change can mixers with internal impellers or rotor/stator devices (e.g., a Turello mixer); and (7) centrifugal mixers (e.g., Hauschild speedmixers). Combinations of mixing devices can also provide benefit. For example, a vessel with an impeller can be connected to a high shear device to provide the mixing.

The choice of mixing device is based on the type of internal phase to be emulsified. For example, low viscosity internal phases can be emulsified using high shear devices that use positive displacement through an orifice. However, in the case of high viscosity internal phases, a rotor/stator device, twin screw compounder or change can mixer are often better choices. In addition, internal phases that contain hydrophilic groups are often easier to emulsify and therefore a simple vessel configured with an impeller may be sufficient.

The viscosity of the copolymer depends on various factors including the molecular weight of the siloxane portion, the number of saccharide units, the mole percent of saccharide units per siloxane, and the external conditions such as temperature and pressure. One skilled in the art would recognize that variable internal phase viscosities may be achieved by varying proportions in blends of copolymers with solvents or solvent mixtures.

The most desirable order of ingredient addition in the preparation of the emulsion is determined empirically. For example, a desirable order of addition for a thick-phase emulsification may be: (1) solubilize the copolymer in a solvent or solvent blend to a desired viscosity; (2) blend in a surfactant; (3) add water in increments with shear until a thick phase emulsion forms; (4) dilute with water to a desired concentration, with shear. A desirable order of addition for a "pre-mix" with high shear may be: (1) add all the water to a mixing vessel configured with an impeller; (2) blend a surfactant with the water; (3) slowly add the copolymer phase to the water to make a rough emulsion; and (4) convey the rough emulsion through a high shear device until a desired particle size is achieved.

Nonionic surfactants are suitable for making the emulsions and include alkyl ethoxylates, alcohol ethoxylates, alkylphenol ethoxylates, and mixtures thereof. Cationic, amphoteric and/or anion surfactants are also suitable and are typically added in addition to a nonionic surfactant. In a specific embodiment the emulsion comprises a nonionic surfactant and in another specific embodiment the emulsion comprises a cationic surfactant and a nonionic surfactant.

In one embodiment of the personal care composition wherein the copolymer is delivered to the composition in the form of an emulsion, the emulsion comprises 5% to 95% copolymer by weight percent of the emulsion and the composition comprises 0.01% to 25% saccharide-siloxane by weight percent of the composition. In a more specific embodiment, the emulsion comprises 10% to 60% copolymer by weight percent of the emulsion and from 0.2% to 10% copolymer by weight percent of the composition. In an even more specific embodiment, the solution comprises 20 to 50% copolymer by weight percent and 0.5 to 2% copolymer by weight of the composition.

The personal care compositions comprising the copolymer may be formulated into personal care products. The personal care products may be functional with respect to the portion of the body to which they are applied, cosmetic, therapeutic, or some combination thereof. Conventional examples of such products include, but are not limited to: antiperspirants and deodorants, skin creams, skin care lotions, moisturizers, facial treatments such as acne or wrinkle removers, personal and facial cleansers, bath oils, perfumes, colognes, sachets, sunscreens, pre-shave and after-shave lotions, shaving soaps, and shaving lathers, hair shampoos, hair conditioners, hair colorants, hair relaxants, hair sprays, mousses, gels, permanents, depilatories, and cuticle coats, make-ups, color cosmetics, foundations, concealers, blushes, lipsticks, eyeliners, mascara, oil removers, color cosmetic removers, wrinkle fillers, skin imperfection hiders, skin surface smoothers, eyelash curlers, nail varnishes, hair make-up products, eye shadows, body makeups, and powders, medicament creams, pastes or sprays including anti-acne, dental hygienic, antibiotic, healing promotive, nutritive and the like, which may be preventative and/or therapeutic.

The personal care products may be generally formulated with a carrier that permits application in any conventional form including, but not limited to, liquids, rinses, lotions, creams, pastes, gels, foams, mousses, ointments, sprays, aerosols, soaps, sticks, soft solids, solid gels, and gels. What constitutes a suitable carrier is readily apparent to one of ordinary skill in the art.

In some personal care product embodiments comprising the personal care composition, inclusion of the copolymer decreases the need for other thickening agents in the formulation. In these embodiments, desired viscosity or thickness of the product is maintained with a lesser amount than is typical of conventional thickeners. This is particularly desirable in products wherein the thickening agent antagonizes a desirable effect of another benefit agent, such as, for example, a conditioning agent. It is also desirable in products where one or more thickening agents are included for processing or formulation characteristics rather than for any desired benefit they provide to the portion of the body to which they are applied. In these cases, the copolymer may permit a decrease in the one or more thickening agents that possess antagonistic performance characteristics.

In some personal care product embodiments comprising the copolymer made by methods of the present invention, inclusion of the copolymer decreases the need for water-in-oil, and more specifically water-in-silicone emulsifiers. The copolymer itself may provide emulsification properties. In these embodiments, desired emulsification of the product is maintained with a lesser amount than is typical of conventional water-in-silicone emulsifiers.

In a specific embodiment of the personal care product comprising the personal care composition, the benefit comprises a conditioning benefit and the portion of the body comprises hair. Specific examples of the conditioning benefit include, but are not limited to an anti-static, lubricity, shine, viscosity, tactile, manageability, or a styling benefit. Non-limiting examples of manageability benefits include ease of dry and/or wet combing. Non-limiting examples of styling benefits include curl retention or hair-relaxing benefits. The conditioner may be a rinse-off or leave-in conditioner. In a specific embodiment, the conditioning benefit comprises a curl-retention benefit.

Examples of suitable conditioning agents include, but are not limited to, cationic polymers, cationic surfactants, proteins, natural oils, silicones other than the copolymer, hydrocarbons, nonionic surfactants, amphoteric surfactants, or mixtures thereof. Examples of additional silicones which may be useful in the present personal care compositions include, but are not limited to: alkyl methyl siloxanes, cyclic siloxanes, gums, linear siloxanes, MQ siloxane resins, MTQ siloxane resins, and polyether siloxane copolymers.

The copolymers formed by the methods of the present invention may assist in benefitting a portion of the body. One such method comprises administration of a safe and effective amount of a personal care product to a portion of the body. In one specific embodiment, a method of treating hair comprising administering a safe and effective amount of the personal care composition is provided. A very specific embodiment provides a method of styling and holding hair comprising administering a safe and effective amount of the personal care composition. As used herein, "safe and effective" means an amount that provides a level of benefit perceivable by a consumer seeking such a benefit without damaging or causing significant discomfort to the consumer seeking such a benefit. A significant discomfort is one that outweighs the benefit provided such that an ordinary consumer will not tolerate it.

Formulating personal care products with the personal care composition comprising the copolymer formed by methods of the present invention described above provides a thickening benefit. In a specific embodiment, an antiperspirant, hair, skin and color cosmetic products are provided. The antiperspirant product is formulated with the personal care composition comprising the copolymer as described above, wherein the benefit comprises a thickening benefit sufficient to maintain suspension of antiperspirant salts when the formulation comprises a substantially less than typical amount of conventional thickeners. In specific embodiments, the antiperspirant product is provided in the form of a solid, a soft solid or a gel. In a more specific embodiment, the solid form comprises a soft solid or a gel.

Another specific embodiment of the present invention is directed to an emulsification benefit for water-in-oil and more specifically, water-in-silicone formulations. The amount of water-in-silicone formulation aids needed may be lower than typical when the copolymer is used in the formulation. In a more specific embodiment, an antiperspirant product is formulated with the composition comprising the copolymer. In an even more specific embodiment, the solid form comprises a gel.

Another specific embodiment provides a personal care product comprising the copolymer made by the methods of the present invention where the benefit comprises an enhanced conditioning benefit and the portion of the body comprises skin. An embodiment directed to a method of treating skin is provided that comprises: (1) administration of a safe and effective amount of the personal care product comprising the personal care composition; and (2) rubbing the safe and effective amount into the skin.

Another specific embodiment is directed to a color cosmetic product comprising the personal care composition where the benefit comprises a cosmetic benefit. More specific embodiments are directed to liquid foundations.

EXAMPLES

The following examples are included to demonstrate the invention to one of ordinary skill. However, those of ordinary skill in the art should, in light of the present disclosure, appreciate that many changes can be made in the specific embodiments which are disclosed and still obtain a like or similar result without departing from the spirit and scope of the invention. All amounts, ratios, and percentages are by weight unless otherwise indicated.

The following ingredients were used in the examples. NMG refers to N-methylglucamine. GPMDES refers to 3-glycidoxypropylmethyldiethoxysilane. GPMDMS refers to glycidoxypropylmethyldimethoxysilane. AGE refers to allyl glycidyl ether. Pt IV refers to a platinum catalyst in which Pt is complexed with divinyltetramethyldisiloxane, also known as Karstedt's catalyst. IPA refers to isopropanol. HMDZ refers to hexamethyldisilazane. TFAA refers trifluoroacetic acid.

Example 1

Synthesis of NMG Functional Diethoxysilane

GPMDES and NMG were obtained from SIGMA-ALDRICH® of St. Louis, Mo. and used without any purification. The specification for both showed >99% purity. A reaction was performed in a 200-proof ethanol solvent using a rotary evaporator and a water bath set at 75° C.

37.27 g of GPMDES and 106 g of 200-proof ethanol were charged in a 250-ml flask. 29.28 g of NMG powder were added to the mixture. The molar ratio of GPMDES to NMG was 1:1. The flask containing GPMDES, ethanol and NMG was attached to the rotary evaporator and reacted at 75° C. while mixing at 125 rpm. The solid NMG dissolved and the reaction mixture became a clear solution after 45 minutes. Samples were withdrawn for NMR analysis after 1 and 3 hours and the ethanol solvent was stripped. The product (NMG methyldiethoxysilane) was crystalline solid after the ethanol was stripped under full vacuum. Proton Nuclear Magnetic Resonance (H-NMR) confirmed the structure. 29Si NMR, however, showed partial condensation of ethoxy groups. H-NMR also showed a decrease in ethoxy $CH_3$ protons by almost 60%.

The H-NMR of the product (NMG methyldiethoxysilane) also showed that the ethoxy groups were intact when ethanol was present in the product and were partially hydrolyzed when ethanol was completely stripped. The 29Si NMR also confirmed the formation of hydrolysis/condensation byproducts.

Example 2

Synthesis of NMG Functional Dimethoxysilane

Methoxy functional NMG-silane was prepared by reacting 3-glycidoxypropylmethyldimethoxysilane with NMG (both obtained from SIGMA-ALDRICH® of St. Louis, Mo.) in methanol solvent. 40.0 g of GPMDMS and 75.4 g of 200-proof methanol were charged in a 250-ml flask. 35.4 g of NMG powder were added to the mixture. The molar ratio of GPMDMS to NMG was 1:1. The flask containing GPMDMS, methanol and NMG was attached to a rotary evaporator and reacted at 60° C. while mixing at 125 rpm. The solid NMG dissolved and the reaction mixture became a clear solution after 30 minutes. A sample was withdrawn for NMR analysis after 105 minutes and the methanol solvent was stripped. The product NMG methyldimethoxysilane was crystalline solid after the methanol was stripped under full vacuum. H-NMR confirmed the structure. 29Si NMR showed partial condensation of methoxy groups.

Example 3A

NMG Siloxane Synthesis by Condensation Route

Synthesis of NMG-siloxanes was carried out by a silanol condensation process. NMG-dialkoxy silanes were condensed with silanol terminated polydimethylsiloxanes in the presence of acid or base catalysts.

First, silanol fluid was reacted with HMDZ to partially cap silanol groups. A TFAA catalyst was primarily used for silanol capping reactions, but was also used for acid-catalyzed silanol/alkoxysilane condensation reaction. In addition to the TFAA catalyst, octanoic acid (OA) and trifluoromethanesulfonic acid (TFAA) were also tested. Base-catalyzed condensation was performed by using potassium hydroxide (KOH) as a base catalyst. Several batches were synthesized to optimize the reaction conditions. 29Si NMR monitored the reaction progress and molecular weight or degree of polymerization (DP) of the sugar siloxane.

Example 3B

Acid-Catalyzed Condensation to Synthesize 300 DP-2P-NMG Siloxane

Partial capping of silanol terminated 50 DP siloxane was carried out by reacting HMDZ with silanol fluid in the presence of a TFAA catalyst. To synthesize a 300 DP siloxane polymer from 50 DP silanol fluid, six moles of silanol fluid were reacted with 1 mole of HMDZ (two silanols out of twelve silanols were capped in the reaction with HMDZ). The reaction was carried out at 80° C. for 4-5 hours, although the reaction may have completed in lesser time (about 2 hours). The longer reaction time may also have caused some condensation of silanols resulting in increased molecular weight and leaving fewer free silanols for condensation with NMG-alkoxy silanes.

Example 4

Synthesis and Testing of NMG-Siloxane Polymers 315 g of silanol fluid having a DP of 50 with terminal silanol functionality were charged in a 1-L flask fitted with condenser, thermometer and a distilling receiver or distilling trap (Dean-Stark). 2.29 g of HMDZ were added at room temperature and mixed. The reaction mixture was heated slowly to 50° C. and TFAA catalyst (0.2 g) was added. Nitrogen gas was flushed through the system to remove $NH_3$ byproduct and the reaction temperature was raised to 80° C. The reaction mixture was cooled after 5 hours and filtered for 29Si NMR analysis. The polymer DP increased from 50 to 116 in the partially capped silanol fluid product.

23.0 g of NMG-methyldiethoxysilane (50% solution in ethanol) were mixed with 255.2 g of partially capped silanol fluid in a flask and heated to 80° C. on a rotary evaporator while mixing. The ethanol solvent was stripped at 15 mmHg vacuum. An octanoic acid catalyst (0.9 g) was added and the condensation was continued for 7.5 hours under vacuum. The reaction mixture slowly became viscous due to condensation of NMG-methyldiethoxysilane with silanol fluid. 29Si NMR analysis showed an increase in DP and decrease in silanol contents. H-NMR also confirmed the presence of N-methyl glucamine protons and $CH_2$ protons attached to silicon in the polymer.

The resulting NMG-siloxane polymer was mixed with 5 wt % Isofol-12 (2-butyl octanol) diluent and emulsified to give a 50% active oil-in-water emulsion. The emulsion was heat aged for 2 months at 45° C. for thermal and hydrolytical stability studies. Both room temperature and heat-aged NMG-siloxane emulsions were evaluated for wet and dry combing force properties in hair care application. Their performance was compared against a standard cationic emulsion.

The hair treatment data showed that NMG-siloxane polymers synthesized from acid condensation route performed as well as the standard cationic emulsion. Specifically, testing was done on an Instron device for both wet combing and dry combing. The results were reported as an average combing force (kg) of 3 tresses times 5 pulls each. The room temperature and heat-aged NMG-siloxane emulsions had higher wet average combing force (0.032 kg and 0.031 kg, respectively) than the standard cationic emulsion (0.021 kg). The room temperature and heat-aged NMG-siloxane emulsions had lower dry average combing force (each had 0.013 kg) than the standard cationic emulsion (0.016 kg). Thus, the room temperature and heat-aged NMG-siloxane emulsions had better dry combing forces than the standard cationic emulsion, but not as good of wet combing force as the standard cationic emulsion. The NMG-siloxane polymers were also hydrolytically stable when emulsified and heat aged at 40° C. for 2 months.

Example 5

Condensation Reaction of NMG-Siloxanes

NMG-siloxanes were prepared by condensation reaction of NMG-methyldimethoxysilane with silanol fluid. 288.3 g of 50 DP silanol fluid were reacted with 2.23 g HMDZ for capping reaction in the presence of 4-5 drops of TFAA catalyst. The reaction mixture was slightly cloudy after 3.5 hours reaction due to the formation of ammonium salts. The reaction mixture was filtered through a 5 micron filter press. 29Si NMR showed slightly lower capping and no significant increase in degree of polymerization. 20.8 g NMG-methyldimethoxysilane (50% in methanol) were mixed with capped siloxane and heated to 80° C. The methanol was stripped under slight vacuum and 1.2 g octanoic acid catalyst was added for silanol condensation. 1.0 g deionized water was added to enhance hydrolysis of methoxysilane after 1.5 hours reaction. The reaction mixture became viscous after 6 hours reaction. 29Si NMR showed polymer DP increased to 137 and some unreacted silanols.

Example 6

One Step Synthesis of NMG Diethoxysilane

Attempts were also made to condense silanol fluid, HMDZ and NMG-diethoxysilane in one step. 150 g silanol fluid having a DP of 50 were mixed with 1.55 g HMDZ, 9.5 g NMG-methyldiethoxysilane and 0.22 g trifluoroacetic acid. The reaction mixture was heated to 80° C. and ethanol was removed under vacuum. Condensation catalyst octanoic acid and catalytic amount of aminoethylaminopropyl triethoxysilane were added and reacted under 15 mmHg vacuum. A polymer-like gel phase separated from the silanol fluid after about a 1 hour reaction. It was found that HMDZ reacted with NMG-diethoxysilane causing it to precipitate out of the reaction mixture. The reaction mixture was a low viscosity polymer after 5 hours condensation and no molecular weight build up was observed.

Example 7

Condensation Reaction of Silanol Fluid

A condensation reaction between silanol fluid and NMG-alkoxysilane was enhanced when a combination of octanoic acid and HMDZ was used as catalyst. It is both an endcapper and a co-catalyst with octanoic acid. 250 g of 50 DP silanol fluid were reacted with 1.9 g of HMDZ using a TFAA catalyst at 80° C. for 4.5 hours. The siloxane DP increased to 116 and the ratio of hydroxyl groups in each siloxane decreased. 75 g of a filtered partially capped siloxane were then reacted with 7.0 g of NMG-diethoxysilane in the presence of 1.0 g deionized water, 0.1 g HMDZ and 0.2 g octanoic acid catalyst at 80° C. under 15 mmHg vacuum. The polymer viscosity increased after 5 hours of reaction time and DP increased to about 200 due to silanol condensation.

Example 8

Condensation Reaction of Silanol Fluid 8.9 g of NMG-diethoxysilane were directly condensed with 150 g of silanol fluid in the presence of an octanoic acid catalyst. There was only a slight increase in siloxane molecular weight after 5 hours condensation (the siloxane DP was 85). A clear and soft viscous polymer was obtained after 9 hours reaction at 85-90° C. in the presence of TFAA catalyst. The polymer was then capped with trimethylsilyl groups by using HMDZ. The 29Si NMR showed that the siloxane DP was about 122 and there were still uncondensed silanols present.

Example 9

Condensation Reaction of Silanol Fluid 151 g of 50 DP silanol and 100 g of toluene were mixed together in a round bottom flask fitted with a condenser, a Dean Stark receiver, mechanical stirrer and a thermometer. A clear solution was formed after mixing. 1.15 g of HMDZ were added and mixed at room temperature for 5 minutes before adding 4-5 drops of TFAA catalyst. The reaction occurred at 60° C. for 1 hour. 29Si NMR showed that partial capping of silanol with trimethylsilyl group occurred without increase in polymer DP. 2.7 g of octanoic acid were then mixed to adjust the pH to 6.5. 13.0 g of NMG-methyldiethoxysilane were then mixed and reacted at 85-110° C. for 5.5 hours. A gel-like polymer phase separated in toluene but dissolved when 50 g IPA were added and mixed. IPA and toluene were later stripped under full vacuum and a soft sticky polymer was obtained having a DP of 112.

Example 10

Condensation of Silanol 150 g of 50 DP silanol and 100 g of toluene were mixed together in a round bottom flask fitted with a condenser, a Dean Stark receiver, mechanical stirrer and a thermometer. A clear solution was formed. 1.80 g of HMDZ were added and mixed at room temperature for 5 minutes before adding 2 drops of TFAA catalyst. The reaction occurred at 80° C. for 2 hours. 29Si NMR showed that partial capping of silanol with trimethylsilyl group occurred and polymer DP increased to 74. 1.0 g of octanoic acid was then mixed to adjust the pH to 5.0. 13.0 g of NMG-methyldiethoxysilane were then mixed and reacted at 85-95° C. for 2.5 hours. 3-4 drops of TFAA were then added to enhance the condensation reaction. A sticky gel-like polymer having a DP of 100 was obtained after toluene was stripped under full vacuum. 29Si NMR analysis indicated only a slight increase in siloxane DP with some Si—OH converting to Si—OZ where OZ may be ethoxy or octanoic acid.

Example 11A

Synthesis of NMG Siloxane in Ethyl Acetate Solvent, Acid Condensation

Acid-catalyzed condensation of NMG-diethoxy silane with 50 DP silanol fluid was carried out in ethyl acetate or butyl acetate solvent. These solvents were not as effective as toluene for condensation reaction due to compatibility. A hazy viscous polymer was observed in the case of ethyl acetate while self-condensation of NMG-diethoxy silane was observed when butyl acetate solvent was used and a gel-like material precipitated out of silanol fluid. There were also limitations of maximum reaction temperature of 77-80° C. with ethyl acetate due to its lower boiling point than toluene.

Example 11B

Base-Catalyzed Condensation to Synthesize 300 DP-2P-NMG Siloxane

Base-catalyzed condensation reactions were performed by using 50% KOH solution as a catalyst. NMG-siloxanes polymers were successfully prepared both by equilibrium and condensation routes. The condensation reaction was faster with KOH than tested acid-catalyzed condensation routes. More cyclic siloxanes, however, were produced during an equilibrium process using KOH as a catalyst.

Example 12

NMG-Siloxane by Base-Catalyzed Equilibrium Process 150.7 g of silanol terminated polydimethylsiolxane, 10.48 g of NMG-methyldimethoxysilane (50% solution in methanol) and 1.02 g. 5 cst 200-fluid, a low viscosity trimethylend-blocked polydimethylsiloxane, were mixed together and condensed using 0.60 g of KOH catalyst at about 100° C. Methanol and water were removed by using a Dean-Stark receiver. A slight increase in viscosity was observed. Viscosity increased significantly when an equilibrium reaction was performed at 130° C. 29Si NMR showed only a trace amount of unreacted silanols, and 3.7 mol % $D_4$ cyclics having a DP of 168. H-NMR confirmed the NMG functionality and dimethyl siloxane units. The product was neutralized by glacial acetic acid after dissolving in IPA and Isofol-12. The IPA was then stripped to get a clear high viscosity NMG-siloxane.

Example 13

NMG-Siloxane by Base-Catalyzed Equilibrium Process Without Capping

A high viscosity polymer was obtained when 50 DP silanol fluid was condensed with NMG-methyldiethoxysilane at 85° C. in the presence of 0.2 wt % KOH. No capping agent was used for terminal capping. 29Si NMR showed the formation of 300-DP NMG-siloxane polymer containing pendant NMG functionality after 9 hours reaction at 80-85° C. Cyclic siloxanes were also formed as shown by the 29Si NMR peak testing.

While the present invention has been described with reference to one or more particular embodiments, those skilled in the art will recognize that many changes may be made thereto without departing from the spirit and scope of the present invention. Each of these embodiments, and obvious variations thereof, is contemplated as falling within the spirit and scope of the invention.

The invention claimed is:

1. A method of making a saccharide siloxane copolymer, the method comprising:
   (a) reacting an amine functional saccharide with an epoxy functional silane containing at least one condensable or hydrolysable group, the epoxy functional silane containing at least one condensable or hydrolysable group being an epoxy functional mono or di-alkoxy silane;
   (b) reacting the product of step (a) with an oligomer to form the saccharide siloxane copolymer; and
   (c) optionally, further including an endcapper to form the saccharide siloxane copolymer.

2. The method of claim 1, wherein the amine functional saccharide is selected from the group consisting of N-methylglucamine, N-ethylglucamine and mixtures thereof.

3. The method of claim 1, wherein the amine functional saccharide is selected from the group consisting of glucosamine, galactosamine, muramic acid, mannosamine, chitosan, a chitosan monomer, a chitosan oligomer, meglumine or mixtures thereof.

4. The method of claim 1, wherein the epoxy functional silane containing at least one condensable or hydrolysable group is a glycidoxypropyl functional silane.

5. The method of claim 1, wherein the epoxy functional silane containing at least one condensable or hydrolysable group is an epoxycyclohexylethyl functional silane, an epoxy alkane or a limonene epoxide functional silane.

6. The method of claim 1, further including an endcapper to form the saccharide siloxane copolymer, the endcapper being trimethyl alkoxysilane.

7. The method of claim 1, wherein the oligomer is a partially capped siloxane.

8. The method of claim 1, wherein the oligomer is a cyclic siloxane or a disilanol siloxane.

9. The method of claim 1, wherein step (b) includes reacting the product of step (a) with capped and uncapped oligomers.

10. The method of claim 1, wherein step (b) includes reacting the product of step (a) with a silane endcapper and an uncapped oligomer.

11. The method of claim 1, wherein the saccharide siloxane copolymer is an emulsion.

12. The method of claim 1, wherein step (b) further includes using an acid or base catalyst.

13. A method of making a saccharide siloxane copolymer, the method comprising:
   (a) reacting N-methylglucamine, N-ethylglucamine or a mixture thereof with an epoxy functional mono or di-alkoxy silane; and
   (b) reacting the product of step (a) with a disilanol oligomer to form the saccharide siloxane copolymer.

14. The method of claim 2, wherein the amine functional saccharide includes N-methylglucamine.

15. The method of claim 2, wherein the amine functional saccharide includes N-ethylglucamine.

16. The method of claim 1, wherein the reaction of step (a) is performed in a polar solvent.

17. The method of claim 16, wherein the polar solvent includes methanol, ethanol, isopropanol, or any combination thereof.

18. The method of claim 1, further including an endcapper to form the saccharide siloxane copolymer.

* * * * *